G. W. DOVER.
LATHE TOOL.
APPLICATION FILED OCT. 31, 1918.
1,301,236.
Patented Apr. 22, 1919.
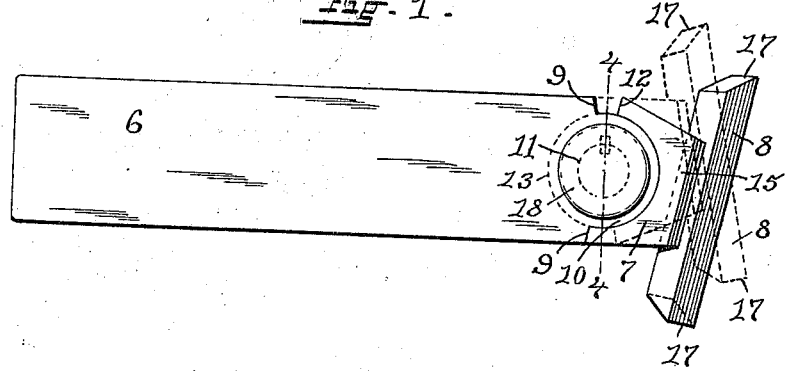
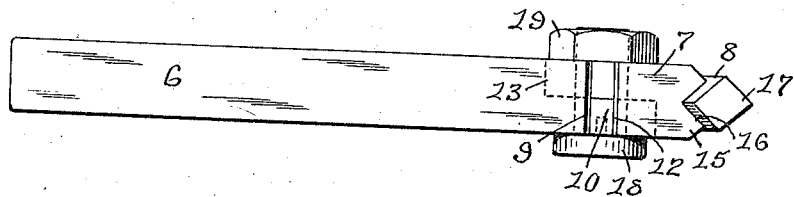
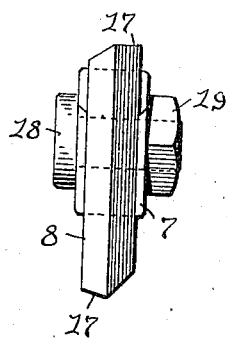
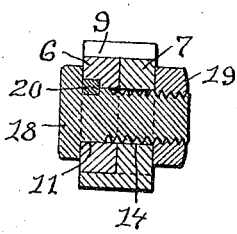
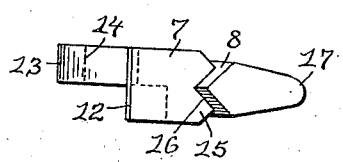
INVENTOR:
George William Dover
by Chas. H. Luther
ATTORNEY.

UNITED STATES PATENT OFFICE.

GEORGE WILLIAM DOVER, OF CRANSTON, RHODE ISLAND, ASSIGNOR TO GEORGE W. DOVER, INCORPORATED, OF PROVIDENCE, RHODE ISLAND, A CORPORATION OF RHODE ISLAND.

LATHE-TOOL.

1,301,236.  Specification of Letters Patent.  Patented Apr. 22, 1919.

Application filed October 31, 1918. Serial No. 260,577.

*To all whom it may concern:*

Be it known that I, GEORGE WILLIAM DOVER, a citizen of the United States, residing at Cranston, in the county of Providence and State of Rhode Island, have invented a new and useful Improvement in Lathe-Tools, of which the following is a specification.

This invention has reference to an improvement in lathe tools and more particularly to an improvement in a lathe tool having double high speed steel cutting points and particularly adapted for use in lathes and planers.

In machine tools of this nature, it is essential that the costly high speed steel of the cutting points should be conserved and the time required in grinding the cutting points and in handling and adjusting the tool should be reduced to a minimum.

The object of my invention is to improve the construction of a lathe tool, whereby the operation of the tool is greatly improved, the loss in the use of high speed steel in the cutting points and time required in grinding the cutting points, greatly reduced.

My invention consists in the peculiar and novel construction of a lathe tool having details of construction, as will be more fully set forth hereinafter and claimed.

Figure 1 is a side view of my improved lathe tool, showing the cutting points in one position in full lines and in the other position in broken lines.

Fig. 2 is a top view of the lathe tool.

Fig. 3 is an end view looking at the cutting end of the tool.

Fig. 4 is a vertical sectional view through the tool taken on line 4 of Fig. 1, and Fig. 5 is a top view of a modified form of cutting point removed from the holder.

In the drawing 6 indicates a holder in the form of a rectangular shaped bar, and 7 a pivoted member to which the double cutting member 8 of high speed steel, is secured by solder. The holder 6 has the transverse stop shoulders 9, 9 and the semi-circular reduced end 10, which is one-half the thickness of the holder 6, and in which is a transverse bolt hole 11. The pivoted member 7 is the same width as the holder 6 and has the transverse stop shoulders 12, 12, the semi-circular reduced inner end 13, which is one-half the thickness of the holder 6 and in which is a transverse bolt hole 14, coinciding with the bolt hole 11, and an outer end 15 in which is a vertically disposed V shaped groove 16, as shown in Figs. 2 and 5. The double cutting member 8 is in the form of a square bar of a predetermined length and having the cutting points 17, 17 on each end, and is secured centrally in the V shaped groove 16 in the pivot member 7, by solder or other means. A bolt 18 extends through the bolt holes 11 and 14 and has a nut 19 engaging with the pivoted member 7, and a key 20 which locks the bolt 18 to the bar 6, as shown in Fig. 4.

When in use and the upper cutting point 17, as shown in full lines in Fig. 1, has become dull, the nut 19 is loosened, the pivoted member 7 and double cutting member 8 is moved into the position, as shown in broken lines in Fig. 1, the nut 19 tightened and the tool turned over, the stop shoulders 9, 9 and 12, 12, giving the correct angle to the double cutting member 8. The cutting member of the tool now has again the same position as shown in full lines in Fig. 1 and what was the lower cutting point is now the new upper cutting point of the tool. When the cutting points 17, 17 on the member 8 are worn down to the pivoted member 7, the member 8 is unsoldered from the member 7. A new cutting member or two worn down cutting member 8, 8 may now be placed end to end in and soldered in the groove 16, the butted ends coming centrally in the groove, thereby saving materially in waste of the costly steel of the cutting member.

By this construction the tool has two cutting points, each of which may be used at the correct angle for turning or planing, the cutting points may be both rights or lefts or one right and the other left, and they may be of any shape or configuration desired.

Having thus described my invention I claim as new:—

1. A lathe tool comprising a holding member, stop shoulders on the holding member, a pivoted member pivotally secured to one end of the holding member, and forming a continuation of the holding member, stop shoulders on the pivoted member, means for pivotally securing the pivoted member to the holding member, and a cutting member on the pivoted member and having outstanding ends formed into cutting points.

2. A lathe tool comprising a holding member, stop shoulders at one end of the holding member, an adjustable pivoted member pivotally secured to one end of the holding member and forming a longitudinal continuation of the holding member, stop shoulders on the pivoted member, means for pivotally securing the pivoted member to the holding member, and a cutting member secured to the end of the pivoted member and having outstanding ends formed into cutting points.

3. A lathe tool comprising a straight holding member, stop shoulders at one end of the holding member, an adjustable pivoted member pivotally secured to one end of the holding member and forming a longitudinal continuation of the holding member, stop shoulders on the pivoted member adapted to engage with the stop shoulders on the holding member and a vertically disposed groove in the end of the pivoted member, a vertically disposed cutting member secured in the groove in the pivoted member and having outstanding ends formed into cutting points, and means for pivotally securing the pivoted member to the holding member.

4. A lathe tool comprising a straight holding member, oppositely disposed transverse stop shoulders at one end of the holding member, an adjustable pivoted member pivotally secured to one end of the holding member and having the same width as the holding member, oppositely disposed transverse stop shoulders on the pivoted member adapted to engage with the stop shoulders on the holding member, and a vertically disposed groove in the end of the pivoted member, a vertically disposed cutting member secured in the groove in the pivoted member and having outstanding ends formed into cutting points, and means for pivotally securing the pivoted member to the holding member.

5. A lathe tool comprising a straight holding member, oppositely disposed transverse stop shoulders at one end of the holding member, an adjustable pivoted member pivotally secured to the stop shoulder end of the holding member and forming a longitudinal continuation of the holding member, oppositely disposed transverse stop shoulders on the pivoted member in a position to engage with the stop shoulders on the holding member and a vertically disposed groove in the end of the pivoted member, a cutting member secured in the groove in the pivoted member and having outstanding ends formed into cutting points, the cutting member having a uniform size and shape in cross section, corresponding to the size and shape of the cutting points, and means for pivotally securing the pivoted member to the holding member.

6. A lathe tool comprising a straight bar shaped holder 6 having transverse stop-shoulders 9, 9 and a semi-circular end 10 one-half the thickness of the holder, and in which is a transverse bolt hole 11, a pivoted member 7 having transverse stop shoulders 12, 12, a semi-circular end 13 one-half the thickness of the holder and in which is a transverse bolt hole 14 coinciding with the bolt hole 11 in the end 10, an end 15 in which is a vertically disposed V shaped groove 16, a double cutting member 8 in the form of a square bar and having cutting points 17, 17 and secured centrally in the groove 16 by solder, a bolt 18 extending through the bolt holes 11 and 14 and having a nut 19 engaging with the pivoted member 7 and a key 20 which locks the bolt 18 to the bar 6, as described.

In testimony whereof, I have signed my name to this specification.

GEORGE WILLIAM DOVER.

Copies of this patent may be obtained for five cents each, by addressing the "Commissioner of Patents, Washington, D. C."